E. THOMSON.
ELECTRICAL MEASURING INSTRUMENT.
APPLICATION FILED JULY 30, 1908.
1,022,517.
Patented Apr. 9, 1912.
2 SHEETS—SHEET 1.
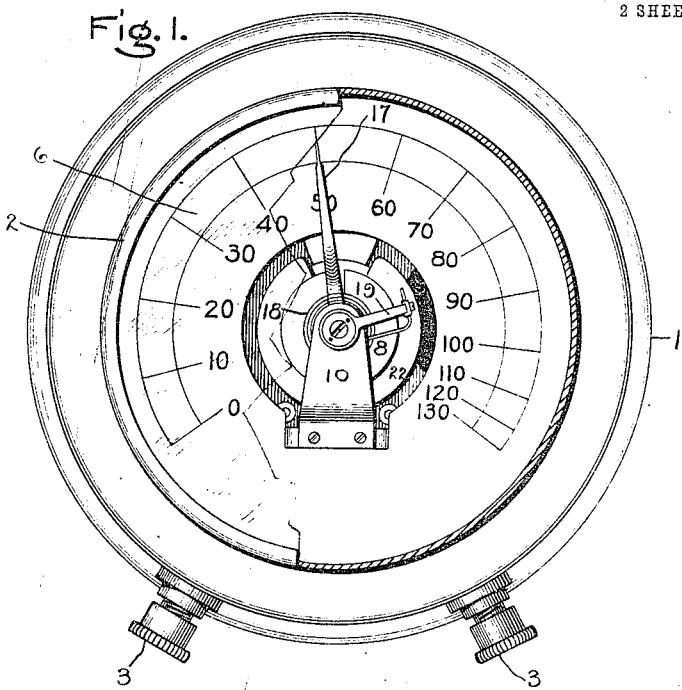
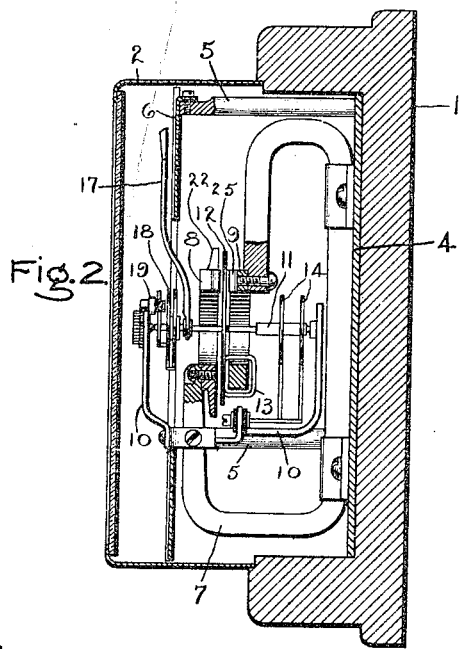
Witnesses:
Inventor,
Elihu Thomson,
By Albert G. Davis
Att'y.

E. THOMSON.
ELECTRICAL MEASURING INSTRUMENT.
APPLICATION FILED JULY 30, 1908.
1,022,517.
Patented Apr. 9, 1912.
2 SHEETS—SHEET 2.
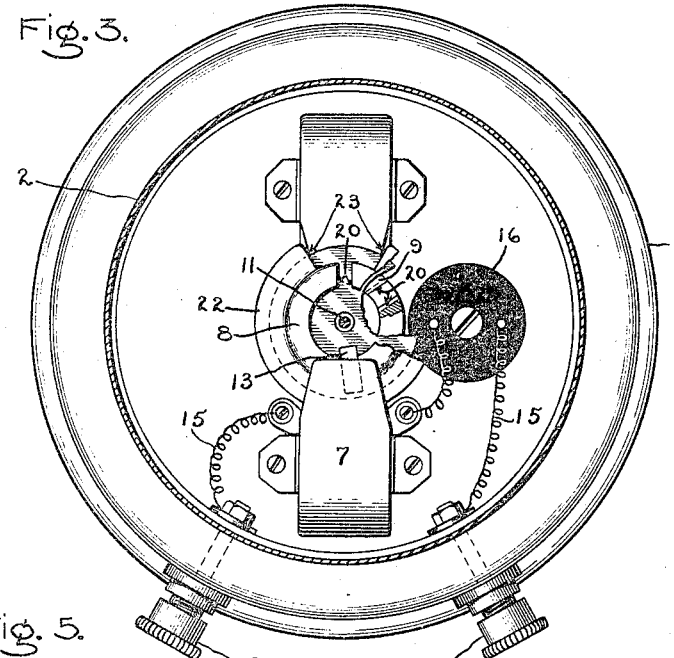
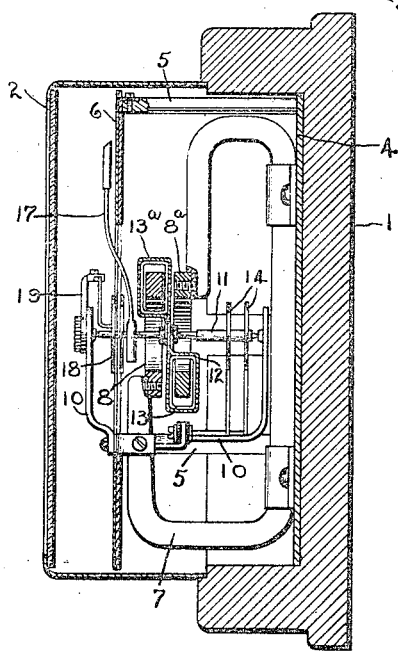
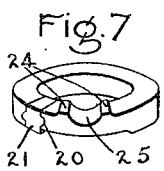
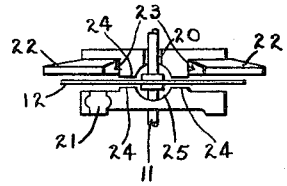
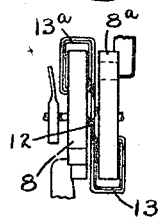
Witnesses:
J. Ellis Glen
J. Earl Ryan
Inventor,
Elihu Thomson,
By Albert G. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRICAL MEASURING INSTRUMENT.

1,022,517.  Specification of Letters Patent.  Patented Apr. 9, 1912.

Application filed July 30, 1908. Serial No. 446,083.

*To all whom it may concern:*

Be it known that I, ELIHU THOMSON, a citizen of the United States, residing at Swampscott, county of Essex, State of Massachusetts, have invented certain new and useful Improvements in Electrical Measuring Instruments, of which the following is a specification.

My invention relates to electrical measuring instruments having current carrying coils mounted to move in the field produced by permanent magnets, and its object is to provide a measuring instrument which has an open, legible and uniform scale; in which the torque is strong and does not tend to cause binding of the moving system at the pivots; and in which strong damping is secured without increasing the weight of the moving system.

My invention will best be understood in connection with the accompanying drawings which are only an illustration of some of the various forms in which the invention may be embodied, and in which—

Figure 1 is a plan view of a measuring instrument; Fig. 2 a cross-sectional view of the instrument shown in Fig. 1; Fig. 3 a plan view of the instrument shown in Fig. 1 with a portion broken away to show the details of construction; Fig. 4 a view in elevation showing the annular pole pieces, the damping disk, and the equalizing flange of the instrument shown in Fig. 1; Fig. 5 a cross-sectional view of a modification, in which two current carrying coils are used; Fig. 6 a view in elevation showing the relation of the annular pole pieces and of the current carrying coils of the instrument shown in Fig. 5; and Fig. 7 a perspective view of a pole piece which may be used in either form of instrument.

The instrument shown in Fig. 1 is circular in form, and comprises a heavy base 1, which is secured to the switch-board or other convenient support and carries a cover 2 formed in part of a glass plate. The base is provided with terminals 3 by means of which current is led to the moving coils of the instrument and as shown in Fig. 2 is preferably recessed to receive a base plate 4 provided with pedestals 5, which support a scale or dial 6 over which the pointer of the instrument swings.

The instrument has a magnetic system comprising a permanent magnet 7 formed as shown in Fig. 2 and secured to the base plate 4 by clamps or other securing means. The magnet has pole pieces 8 and 9 mounted parallel to each other and separated by a narrow air gap in which an intense magnetic field exists. The pole pieces, preferably annular in form, are mounted eccentrically on the magnet poles, by which I mean each of the magnet poles engages a pole piece at a point near its periphery. Although the poles are out of alinement, the pole pieces are superimposed so as to be parallel to each other and to have a common axis and are separated by an air gap in which exists a strong uniform annular field through which the current carrying coil moves, whereby an instrument is secured which has a long uniform scale, as shown in Fig. 1.

The moving system of the instrument is supported by brackets 10 carried by the pedestals 5 and having bearings for the arbor or pivot 11, which is mounted concentric with the common axis of the annular pole pieces of the permanent magnet 7 and carries a coil supporting member 12 preferably made in the form of a disk of sheet metal or other suitable conducting material extending into the field between the pole pieces 8 and 9 to act as a damping disk. The current carrying coil 13 of the moving system is mounted on the damping disk 12 and as shown in Fig. 2 is arranged to encircle the lower pole piece 9 of the permanent magnet 7 to bring a portion of the current carrying coil into the very intense and uniform magnetic field between the pole pieces. The current is carried to the coil 13 by spiral flexible leading-in conductors 14 connected to the terminals 3 through suitable leads 15 and a resistance 16 which acts as a compensator. A pointer 17, mounted on the arbor 11 in a position to counterbalance the weight of the coil 13, swings over the long scale plate 6, which is uniformly graduated as shown in Fig. 1 and is very legible. The moving system turns against the resistance of a restraining or control spring 18, with one end attached to the arbor 11 and the other end to an adjuster 19 movable about the arbor 11 as a center to vary the tension of the restraining spring.

The modified form of the instrument shown in Figs. 5, 6 and 7 is the same in general construction as the instrument just described, but differs therefrom in that two current carrying coils are symmetrically mounted on the damping disk 12 in such a manner that one coil encircles one pole piece and the other coil diametrically opposite it encircles the other pole piece and hence the forces which tend to turn the moving system on its pivots are equalized and are applied in opposite directions at opposite ends of a diameter of the moving system. As shown in Figs. 5 and 6 a plurality of current carrying coils 13 and 13ª are symmetrically mounted on opposite sides of the damping disk 12 to encircle the two pole pieces 8 and 8ª, the coils balancing each other about the arbor 11 as a fulcrum and the forces developed by the coils forming couples which tend to turn the arbor without exerting any side strain on it. The friction is very small in both forms of the instrument, since the moving system, which consists only of a current coil, a damping disk and a pointer, is of minimum weight.

As best shown in Figs. 2 and 3, the confronting annular pole pieces, which are in different planes, have a common axis and are mounted parallel to each other. Each pole piece is provided with a slot or opening 20 to permit the moving system to be placed in position, and since the slot in the lower pole piece 9 is in the path of movement of the coil it is preferably closed after the moving system is in place by an iron plug 21 as shown in Fig. 7, thereby making the pole piece a continuous ring of magnetic material, while the slot in the upper pole piece 9 has no effect on the movement of the coil and may be left open. Owing to the relation of the poles of the magnet, the magnetic flux is more dense adjacent the poles than at other points in the annular air gap unless some provision is made to equalize the flux and in accordance with my invention the magnetic flux is distributed uniformly throughout the path of movement of the current carrying coil 11 by means of an equalizing member or projection 22, preferably in the form of an annular flange secured to or forming part of the upper pole piece 8 and proportioned to produce a uniform flux between the pole pieces throughout the desired distance. The flange extends without interruption under the upper pole 8 where the flux has a tendency to concentrate, but is provided with a gap 23 over the pole 9, because the current carrying coil does not move over that pole and the equalizing influence of the flange is not required. No shield or flange is required on the lower pole piece 9 which is attached to the magnet pole at a place which is not traversed by the current carrying coil. The flange may be tapered or otherwise altered in shape to produce any desired distribution of the flux, but is preferably made annular and of uniform cross-section, as shown in the drawing.

Since the damping member is made in the form of a disk some provision must be made to permit the current induced in the disk to return or flow back in order to secure a damping effect. This result is preferably accomplished by weakening the field in any suitable way at some point outside the path of movement of the coil, the preferred arrangement being that shown in Figs. 2, 4 and 7, where each pole piece is provided with a radial groove 25 between horns or projections 24. The two sets of horns coöperate as shown in Fig. 4, to produce two very intense fields of force separated by a weaker field due to the presence of the radial grooves 25. The portion of the magnetic field due to the horns and grooves has nothing to do with deflecting the current coil, but acts solely to produce the damping effect on the disk which, in all positions of the moving system, extends through the fields produced by the horns and grooves. Since the magnetic field is practically abolished between the radial grooves 25 the damping currents developed in the disk by the intense fields between the opposing ends of the horns 24 can return or flow back by a short return circuit in the neutral space between the grooves, thereby producing a strong damping effect. The magnetic field between the two annular pole pieces is therefore divided into two distinct and independent portions, one of which is proportioned to secure a strong damping while the other is traversed by the current coil and has the flux made uniform throughout the path of the coil.

My invention may be embodied in many other forms than that shown and described, and I do not limit it to the precise arrangement disclosed but intend to cover by the appended claims all changes and modifications within the spirit and scope of my invention.

What I claim as new and desire to secure by Letters Patent of the United States, is,—

1. A measuring instrument comprising a magnet having confronting parallel annular pole pieces eccentrically mounted on the poles of said magnet, one of said pole pieces having a flange adapted to counteract irregularities in the field due to the relation of the poles of the magnet and thereby produce a uniform magnetic flux throughout a definite portion of the air gap between said pole pieces, and a current coil mounted to move in said portion of said air gap.

2. A measuring instrument comprising a magnet and confronting parallel annular pole pieces eccentrically mounted on the poles of said magnet, one of said pole pieces having an equalizing flange shaped to produce a uniform magnetic flux between the pole pieces, and a current coil mounted to move between said pole pieces.

3. A measuring instrument comprising a magnet having its poles out of alinement and parallel annular pole pieces eccentrically mounted on the poles of said magnet, one of said pole pieces having an equalizing flange extending between the pole of the magnet and the opposing pole piece and shaped to produce a uniform magnetic field between said pole pieces, and a current coil mounted to move between said pole pieces.

4. In a measuring instrument, the combination with a magnet having annular pole pieces mounted side by side and parallel to each other one of said pole pieces having a flange and a radial groove adapted to produce an annular field having adjacent portions of different flux density, of a moving system comprising a damping member of conducting material extending through both said adjacent portions of different flux density.

5. In a measuring instrument, the combination with a magnet having annular pole pieces mounted parallel with each other and side by side and provided with radial grooves in the adjacent faces to produce a weak field between two strong fields, of a moving system comprising a damping disk pivoted concentric with said pole pieces and extending through all said fields in all positions of the moving system.

6. In a measuring instrument, the combination with a magnet having confronting pole pieces, each provided with projections separated by a recess, said projections coöperating to produce strong fields separated by a weak field due to said recesses, of a moving system comprising a damping member of sheet metal mounted to extend through all said fields in all positions of the moving system.

7. In a measuring instrument, the combination with a magnet having annular pole pieces mounted side by side and parallel to each other and one of said pole pieces having a flange and a radial groove adapted to produce an annular field having one portion of uniform strength and a second portion comprising two strong fields separated by a weak field, of a moving system comprising a current carrying coil mounted to move in one portion of said field, and a damping member mounted to move in the second portion.

8. In a measuring instrument, the combination with a moving system comprising a current coil and a damping member of sheet metal, of a magnet having annular pole pieces mounted side by side and parallel to each other one of said pole pieces having a flange adapted to produce a uniform magnetic field throughout the path of the coil, said pole pieces having opposed radial grooves outside the path of the coil to produce a magnetic flux of low density to cut said damping member in all positions of the moving system.

In witness whereof, I have hereunto set my hand this twenty eighth day of July, 1908.

ELIHU THOMSON.

Witnesses:
   JOHN A. MCMANUS, Jr.,
   HENRY O. WESTENDORP.